Oct. 16, 1962    J. J. McDERMOTT ETAL    3,058,486
CHECK VALVE
Filed Jan. 4, 1960
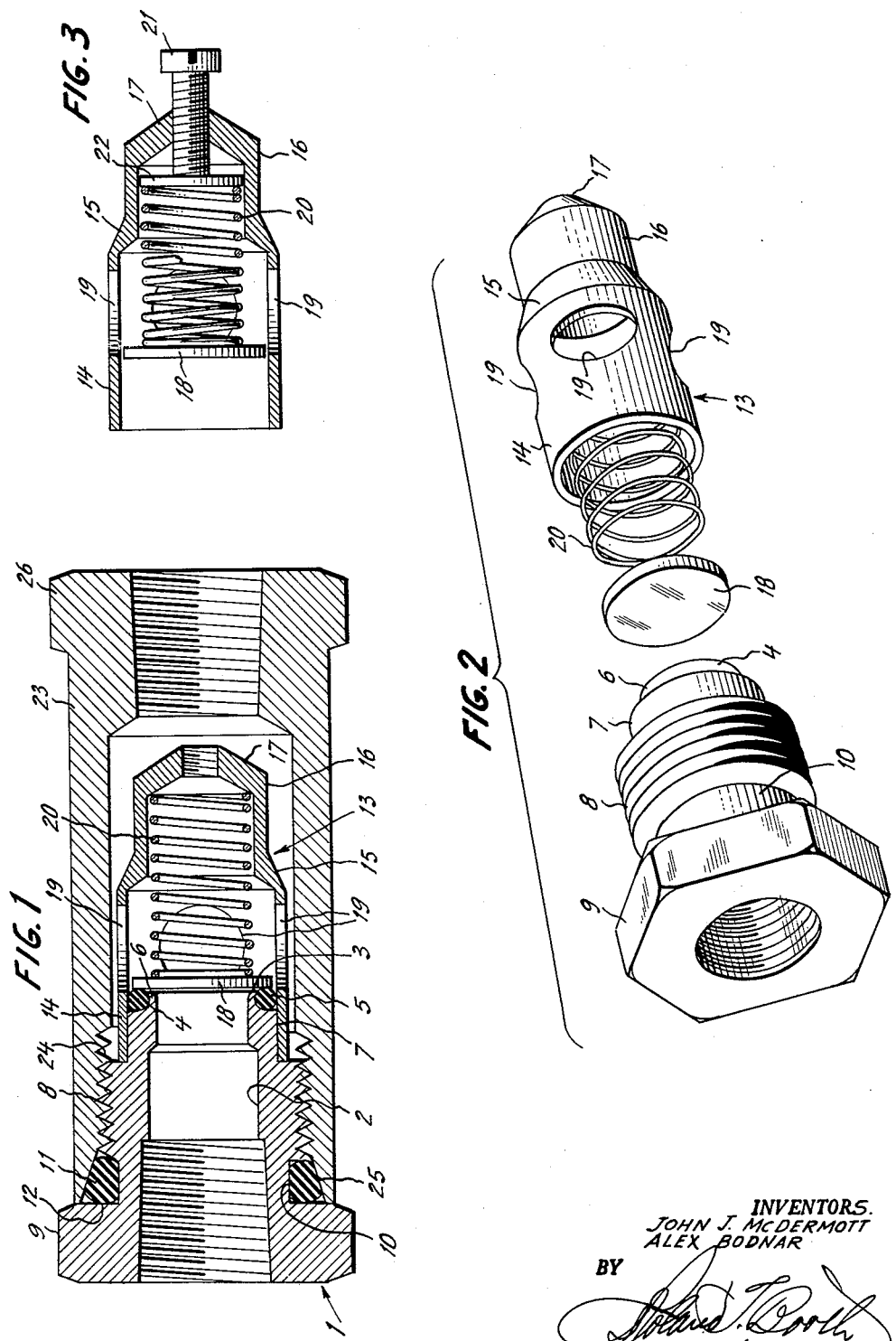
INVENTORS.
JOHN J. McDERMOTT
ALEX BODNAR
BY
ATTORNEY

United States Patent Office 3,058,486
Patented Oct. 16, 1962

3,058,486
CHECK VALVE
John J. McDermott, 6 Summit St., Eastchester, N.Y., and Alex Bodnar, 3218 Barker Ave., Bronx, N.Y.
Filed Jan. 4, 1960, Ser. No. 264
2 Claims. (Cl. 137—515.5)

This invention relates to improvements in check valves.

The invention provides a check valve having a disk valve slidable in a cage member housing the valve spring, with the cage member mounted on the seat member to facilitate assembly of the valve parts, in cooperative relation so operation of the valve may be observed through the apertures in the cage member and checked or adjusted before final assembly in the body member. This construction provides for fluid discharge from the passage in the seat member outwardly between the valve seat and valve through the apertures in the cage member without the valve disk and spring being in the path of fluid flow.

The invention provides a check valve having a seat member formed with a valve seat on one end, a groove adjacent the valve seat mounting an O-ring having a portion extending slightly beyond the seat for cooperation with a disk valve in effectively sealing the valve on the seat member. The cage member mounted on the seat member encloses and effectively retains the O-ring in a position so fluid passes over the O-ring to eliminate any tendency to dislodge the ring. With this construction the disk valve and spring are mounted in the cage member providing an assembly on the seat member which may be used in a pipe line with a body member, or without the body member as a relief valve, or to control flow between one chamber and another, such as a series of storage tanks, fuel tanks, etc. Since the valve mechanism is carried by the seat member, the seat member may be mounted in tank walls, compartment walls, or various types and shapes of pipe fittings without change in the valve construction and without disturbing the valve setting.

This invention provides a check valve that is particularly adaptable to installations requiring low back pressure for a desired rate of flow; closely adjusted opening pressure; very low opening pressure; field adjustment of opening pressure; or rapid closing on reversal of flow.

The invention provides a check valve which may be made in many different sizes, particularly small sizes without change in construction, providing for a wide range of shock, pressure and flow conditions, providing for visual inspection during assembly, checking and adjustment before application of the body member or other enclosing casing.

The invention provides a check valve having a new combination of elements in which the valve disk and spring are housed in the cage member mounted on the seat member to extend from one end thereof in coaxial relation for cooperation to operate under varying conditions in controlling fluid flow, be open to visual inspection during assembly, operable in assembled relation during visual inspection, adjustable upon assembly and adaptable to a variety of uses of a character and having advantages that will be hereinafter more fully described.

In the drawings:

FIG. 1, is an enlarged longitudinal cross section through a check valve constructed according to the present invention.

FIG. 2, shows the seat member, cage member, valve disk and spring in disassembled separated relation to each other, in perspective.

FIG. 3, is an enlarged longitudinal cross section through the cage member and portions of the seat member showing the means for adjusting the tension of the valve spring.

A seat member 1, as shown in FIGS. 1 and 2, is formed of cylindrical shape with a longitudinal passage 2 opening through opposite ends. One end of seat member 1 has the extremity formed with a flat surface forming valve seat 3 extending about the open end of passage 2. The outer surface of seat member 2 is formed with annular groove 4 having a partially cylindrical shape in cross section and of the same size as the outside surface of O-ring 5 seated in groove 4. The surface of seat member 2 forcing groove 4 intersects the valve seat at an acute angle with the seat member having an outwardly extending flange portion indicated at 6 in FIG. 1, for retaining O-ring 5 in groove 4 against displacement.

The seat member is formed with a cylindrical outer supporting portion 7 adjacent groove 4 having a transverse dimension at least equal to the outer dimension of O-ring 5. A cylindrical attaching portion 8 which may be threaded provides for attaching the seat member to other structures in operative position. A head portion 9 is formed on the end of seat member 2 opposite to that having valve seat 3 and may have an outer hexagonal shape to provide a series of surfaces for the application of a wrench in applying the seat member to a casing or body member. Seat member 2 is formed with a sealing ring groove 10 between head portion 9 and attaching portion 8 for receiving an O-ring forming a sealing ring 11. Head portion 9 has a shoulder 12 formed at the end adjacent sealing ring groove 10. Threaded attaching portion 8 has a diameter greater than cylindrical outer supporting portion 7 for a purpose hereinafter described.

A cage member 13 has an open cylindrical end portion 14 of a size suitable for having the cage member pressed on cylindrical outer supporting portion 7 to rigidly secure the cage member to the seat member in substantially coaxial relation as shown in FIG. 1. Supporting portion 7 and the open end portion 14 of cage member 13 may have a threaded connection if desired instead of the pressed fit illustrated. Cage member 13 has an angular portion 15 connecting cylindrical end portion 14 to a smaller cylindrical portion 16 having the end closed by end wall 17. Cylindrical end portion 14 of the cage member provides a guideway along the inner surface for the edge of disk valve 18 to slide on in opening and closing movement relative to valve seat 3. Cylindrical end portion 14 is formed with apertures 19 so fluid passing through passage 2 may flow laterally outward from cage member 13 between the disk valve 18 and valve seat 3. In open position disk valve 18 will be limited in opening movement by engaging angular portion 15. Cage member 13 has cylindrical end portion 14 arranged, as shown in FIG. 1 to retain O-ring 5 in annular groove 4 in assembled relation and in a location out of the direction of fluid flow through apertures 19 from valve seat 3.

Disk valve 18 has flat opposite faces in substantially parallel relation so one face may engage both O-ring 5 and valve seat 3 for effectively sealing passage 2 in the seat member against reverse fluid flow. A valve spring 20 having a plurality of convolutions of the same size to provide a substantially cylindrical spring has one end engaged with the other flat face of disk valve 18.

The other end of valve spring 20 engages end wall 17 adjacent to smaller cylindrical portion 16 of the cage member. Spring 20 has a size to slidably fit in smaller cylindrical portion 16 of cage member 13 as shown in FIG. 1. End loops are formed on spring 20 to lie in a plane perpendicular to the axis of the spring for holding the valve disk parallel to the valve seat. When disk valve 18 moves toward open position and when it is in full open position engaged with angular portion 15, valve spring 20 is compressed so that it is gradually moved into smaller portion 16 until substantially the entire spring is housed in portion 16 when valve 18 is in full open position. Valve spring 20 is mounted in a position to be out of the direction of fluid flow so that variations in the rate and quantity of flow will not affect the operation of the spring to normally move the valve to closed position when the pressure is reduced below a predetermined amount according to the force of spring 20 which is a compression spring. Spring 20 exerts a predetermined pressure on valve 18 to obtain the desired operation of the valve.

Where it is desired to obtain a fine adjustment of the spring pressure on valve 18, an adjusting screw 21, as shown in FIG. 3, may be threadably mounted in end wall 17 in coaxial relation with the spring and valve. An adjusting plate 22 mounted on the inner end of screw 21 has the marginal portion providing a seat for the end of valve spring 20. The tension on spring 20 may be increased or decreased to vary the pressure at which valve 18 will close to obtain a fine pressure adjustment. This adjustment may be made after the seat member is assembled on the pipe or conduit through which the fluid flows so visual operation of the disk valve may be made.

The end of seat member 1 having head portion 9 may have threads formed in the portion forming the longitudinal passage 2 therein or may be formed in some other convenient manner for attaching the seat member to a pipe or conduit for discharging fluid through the check valve. When the check valve is used in a pipe line, seat member 1 is mounted in a body member 23, as shown in FIG. 1. Body member 23 is of substantially cylindrical shape and between opposite ends has an inner cylindrical surface with a diameter equal to that of threaded attaching portion 8 of seat member 1. At one end body member 23 has a threaded portion 24 for threaded interengagement with attaching portion 8 for rigidly mounting the body member on the seat member in substantially coaxial relation. Between threaded portion 24 and the extremity of body member 23, the inner surface is formed with a tapered sealing portion 25 for engaging sealing ring 11 and compressing it to tightly seal the body and seat members against leakage of fluid when the extremity of the body member enages shoulder 12 on head portion 9. The oposite end of body member 23 is formed with a head portion 26 having a hexagonal outer surface for receiving a wrench so the body member may be tightly secured to the seat member in assembled relation. The opposite end of body member 23 having head portion 26 is formed with a threaded opening or other suitable construction communicating with the passage through the body member so a suitable pipe or conduit may be attached to the body member. The inner walls of body member 23 are spaced outwardly from the outer walls of cage member 13 so that fluid may flow longitudinally from apertures 19 toward head portion 26 and outwardly through the pipe or conduit connected to the body member without obstruction.

The construction of the valve as above described is economical, because the parts can be made on ordinary production machinery without requiring special tools or machines. The disk valve and spring may be conveniently assembled in the cage member which may then be readily pressed on the seat member. Visual inspection of the cage member and valve may be made during and after complete assembly on the seat member. The pressure of valve spring 20 may be readily checked during and after assembly to obtain the desired operation of the disk valve. The operation of the valve may be observed under operating conditions where the entire valve and cage member are assembled on and carried by the seat member independent of the body member.

It will be understood that the check valve herein described may be made in various sizes and is adapted for manufacture of very small size check valves. For example, dimension of the outside of the body member may be three-fourths of an inch while the pipes connected with the seat and body members may have an outside dimension of forty thousandths of an inch with other dimensions in corresponding proportion. The check valve may have an overall length of approximately two inches.

The seat member and valve assembly carried thereby may be used as a relief valve without the body member. The seat member may be mounted in a tank or compartment wall for controlling flow of liquid or gas between a pipe and tank, or between tanks or chambers. The seat member may be mounted in other types of fittings of any shape from that of body member 2 without any change in the construction, mounting or adjustment of the valve. The body member or other fitting can be assembled with the seat member without changing or in any way affecting the operation or adjustment of the valve mechanism.

The present invention provides a check valve having low back pressure for rate of flow because fluid flows through two right angle turns from the seat member through the cage member into the body member, casing or chamber without further restriction. The valve may be adjusted for a critical opening pressure for excess pressure relief purposes and safety, such as with steam. The check valve is useful in vacuum systems between the chamber being evacuated and the vacuum pump where the valve should have a very low opening pressure. The present check valve may be constructed for a very low opening pressure so a high vacuum may be pulled through the valve which operates positively in cooperation with the pump to aid in regulating the vacuum pressure. In hydraulic systems, low opening pressure of a check valve, such as possible with the present invention reduces load on the pump and efficiently controls fluid flow. Wear on the pump, pump motor and reduction in power consumption is obtained with use of the invention.

Field adjustment of opening pressure on the check valve is important when used in airborne instrument housings for such things as aerial cameras and the like where desiccated air must be admitted on return to the earth or expel air on leaving the earth, so that the pressure within and without the housing is nearly in balance to prevent distortion due to imbalance.

The check valve according to the invention is also quick closing. This makes the valve useful as a safety check valve on oxyacetelyne systems where the rapid action of the valve will prevent flame from passing and prevent an explosion. The short travel and low inertia of the disk valve which is light in weight and the spring mounting and guiding in the cage provides quick positive valve operation.

The adjustment of the opening pressure of the valve may be made by using a threaded connection between the cage member and supporting portion 7 so the cage member may be adjusted relative to the seat member. Where the cage member is applied to the seat member by a friction fit a screw 21 is used to adjust the spring tension.

The invention claimed is:
1. A check valve comprising
 (1) a seat member formed with a central passage extending therethrough, one extremity of said member being formed with
    (a) a transversely extending valve seat, said seat member being formed with a cylindrical outer surface of partially spherical shape in cross section intersecting said valve seat to form an annular groove adjacent said valve seat,
    (b) a cylindrical outer supporting portion on the end of said member formed with said valve seat, adjacent to said cylindrical outer surface
    (c) a threaded attaching portion adjacent to and having a substantially larger transverse dimension than said cylindrical portion to define a longitudinally extending flow passage about the end of said seat member formed with said valve seat and (d) a head portion on the opposite end formed to provide a transversely extending shoulder facing said threaded attaching portion a resilient sealing ring having a cylindrical cross section seated on said cylindrical outer surface about said valve seat and having a portion extending slightly beyond the plane of said valve seat at the outer edge thereof.

(2) a cage member formed with
   (a) an end wall at one end thereof
   (b) a smaller cylindrical portion extending toward the opposite open end from said end wall and terminating in
   (c) an angular stop portion intermediate the ends of said cage member,
   (d) a larger cylindrical portion extending from said angular stop portion to the open end of said cage member having an imperforate end portion with a rigid friction fit on said cylindrical outer supporting portion on said seat member for attaching said cage member to said seat member to extend in substantially coaxial relation therewith outwardly beyond said valve seat and a portion of said imperforate end portion retaining said sealing ring in said annular groove,
   (e) said cage member having an outer dimension less than and spaced inwardly from said threaded attaching portion on said seat member sufficiently to cooperate in defining the inner wall of the flow passage about said seat member and cage member,
   (f) said cage member being formed with apertures in an intermediate portion between said angular stop portion and said valve seat on said seat member for fluid flow from the inner portion of said cage member outwardly into said flow passage, (3) a valve slidably engaged in said larger cylindrical portion of said cage member formed of
   (a) a thin piece of sheet material having substantially parallel opposite sides,
   (b) one side of said valve being adapted to engage said valve seat and sealing ring and the other side having the outer marginal portion adapted to engage said angular stop portion, (4) a compression spring housed in said cage member,
   (a) slidably engaged in said smaller cylindrical portion for maintaining said spring in coaxial relation with said valve with opposite ends engaging said valve and the end wall of said cage member respectively, and
   (b) normally retaining said valve engaged with said seat, (5) whereby said seat member may have the end formed with said head portion mounted on a pipe for fluid flow from said pipe through the opposite end of said seat member to force said valve away from said valve seat and against said angular stop portion by compressing said spring into said smaller cylindrical portion of said cage member with fluid passing outwardly through the apertures in the larger cylindrical portion of said cage member from between the extremity of said seat member formed with said valve seat and the adjacent face of said valve into the flow passage along the outer wall of said cage member.

2. A check valve comprising
(1) a seat member of substantially cylindrical form having
   (a) a longitudinal passage opening through opposite ends thereof, one end of said seat member being formed with
   (b) a flat valve seat on the extremity, said seat member having the outer surface adjacent said valve seat formed with
   (c) an annular groove partially cylindrical in cross-section with the surface of said groove intersecting said valve seat at the end of said seat member, said seat member having
   (d) a cylindrical outer supporting portion formed thereon adacent said annular groove and spaced outwardly beyond the outer edge of said seat portion,
(2) an O-ring mounted in and filling said annular groove and surrounding said seat member with
   (a) a portion extending beyond the end of said seat member and valve seat,
(3) said cylindrical outer supporting portion having a transverse dimension at least equal to the transverse outer dimension of said O-ring, said seat member being formed with
(4) a threaded attaching portion adjacent to and having a greater transverse dimension than said cylindrical outer supporting portion to define
   (a) a flow passage extending coaxially toward the end of said seat member formed with the valve seat,
(5) a head portion formed on the opposite end of said seat member having a
   (a) shoulder facing said attaching portion, said seat member being formed with a
   (b) sealing ring groove on the outer surface between said shoulder and the adjacent end of said attaching portion,
(6) a sealing ring mounted in said sealing ring groove,
(7) a cylindrical cage member having
   (a) a larger cylindrical portion open at one end and formed with an imperforate portion at the open end having the inner cylindrical surface rigidly engaged on said cylindrical outer supporting portion of said seat member for support thereon with said cage member extending in substantially coaxial relation with and beyond the valve seat end of said seat member and enclosing and retaining said O-ring on said seat member, said larger cylindrical portion extending beyond said valve seat end of said seat member and having apertures formed therein adjacent said valve seat for fluid flow from said seat member into said larger cylindrical portion of said cage member and outwardly through said apertures into said flow passage and along the outer side of said cage member,
   (b) an angular stop portion at the outer end of said larger cylindrical portion extending inwardly and having
   (c) a smaller cylindrical portion extending therefrom in coaxial relation with said larger cylindrical portion in an opposite direction from said stop portion and terminating in an end wall forming the outer end of said cage member,
(8) a disk valve slidably mounted in said larger cylindrical portion of said cage member having a flat face on one side for engaging said valve seat and O-ring,
(9) a compression coil spring slidably mounted in said smaller cylindrical portion with one end engaging said end wall and the opposite end engaging said disk valve for normally retaining said disk valve in position to close the passage in said seat member in cooperation with said valve seat and O-ring,
(10) said disk valve engaging said angular stop portion in open position with said coil spring more completely housed in said smaller cylindrical portion when fluid flows through said seat and cage members outwardly through said apertures in said larger cylindrical portion of said cage member, and

(11) a cylindrical body member formed with
- (a) a cylindrical inner wall having a size equal to that of the threaded attaching portion and formed with complementary threads interengaged to secure said body member at one end to said attaching portion of said seat member and having the adjacent extremity of said body member formed with
- (b) a tapered sealing portion extending outwardly from said cylindrical inner wall and having sealing cooperation with said sealing ring with the extremity of said body seated against said shoulder on said seat member, said body member having
- (c) said cylindrical inner wall extending about said cage member in spaced relation to form the outer wall portion of said flow passage to provide for free fluid flow from the apertures in said cage member outwardly through the opposite open end of said body member,
- (d) and said body member having the opposite end extending beyond said cage member formed for attachment to a fluid conduit.

References Cited in the file of this patent

UNITED STATES PATENTS

| | | |
|---|---|---|
| 1,150,743 | Butts | Aug. 17, 1915 |
| 1,269,616 | Le Bozec | June 18, 1918 |
| 1,938,418 | Evans | Dec. 5, 1933 |
| 1,993,567 | Richardson | Mar. 5, 1935 |
| 2,710,023 | Blackford | June 7, 1955 |
| 2,737,974 | Renick | Mar. 13, 1956 |
| 2,800,142 | Champion | July 23, 1957 |
| 2,918,083 | Clark | Dec. 22, 1959 |

FOREIGN PATENTS

| | | |
|---|---|---|
| 87,254 | Switzerland | Nov. 16, 1920 |
| 859,658 | France | June 10, 1940 |